(12) United States Patent
Bogdanov

(10) Patent No.: US 6,301,976 B1
(45) Date of Patent: Oct. 16, 2001

(54) TORQUE SENSING APPARATUS HAVING A MAGNETOELASTIC MEMBER SECURED TO A SHAFT

(75) Inventor: Leonid V. Bogdanov, Troy, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/271,706

(22) Filed: Mar. 18, 1999

(51) Int. Cl.$^7$ .................................................. G01L 3/10
(52) U.S. Cl. ............................. 73/862.333; 75/862; 75/8
(58) Field of Search ...................... 73/862.331, 862.333, 73/862.335

(56) References Cited

U.S. PATENT DOCUMENTS

| 4,845,999 | 7/1989 | Sobel . | |
|---|---|---|---|
| 4,873,874 | * 10/1989 | Sobel | 73/862.333 |
| 5,280,729 | 1/1994 | Aoki et al. | 73/862.335 |
| 5,353,649 | 10/1994 | Hase et al. | 73/862.335 |
| 5,520,059 | 5/1996 | Garshelis | 73/862.335 |
| 5,831,180 | * 11/1998 | Tanaka et al. | 73/862.333 |

FOREIGN PATENT DOCUMENTS

| 63317734 | 12/1988 | (JP) . |
| 05045240 | 2/1993 | (JP) . |

* cited by examiner

*Primary Examiner*—Benjamin R. Fuller
*Assistant Examiner*—Andre Allen
(74) *Attorney, Agent, or Firm*—Tarolli, Sundheim, Covell, Tummino & Szabo L.L.P.

(57) ABSTRACT

A shaft (12) experiences torsion about its axis (14) in response to an applied torque (T). A cylindrical magnetoelastic member (16) is secured coaxially about the shaft (12). The magnetoelastic member (16) has first and second spaced apart end portions (18, 20). Each end portion (18, 20) is chamfered at a predetermined angle ($\Theta_1$, $\Theta_2$) with respect to a plane (22, 24) extending perpendicular to the shaft axis (14). The magnetoelastic member (16) provides a magnetic field in response to the torsion of the shaft (12). A detector (30) is positioned adjacent to the magnetoelastic member (16) for sensing the magnetic field and providing a signal indicative of the applied torque (T).

5 Claims, 1 Drawing Sheet

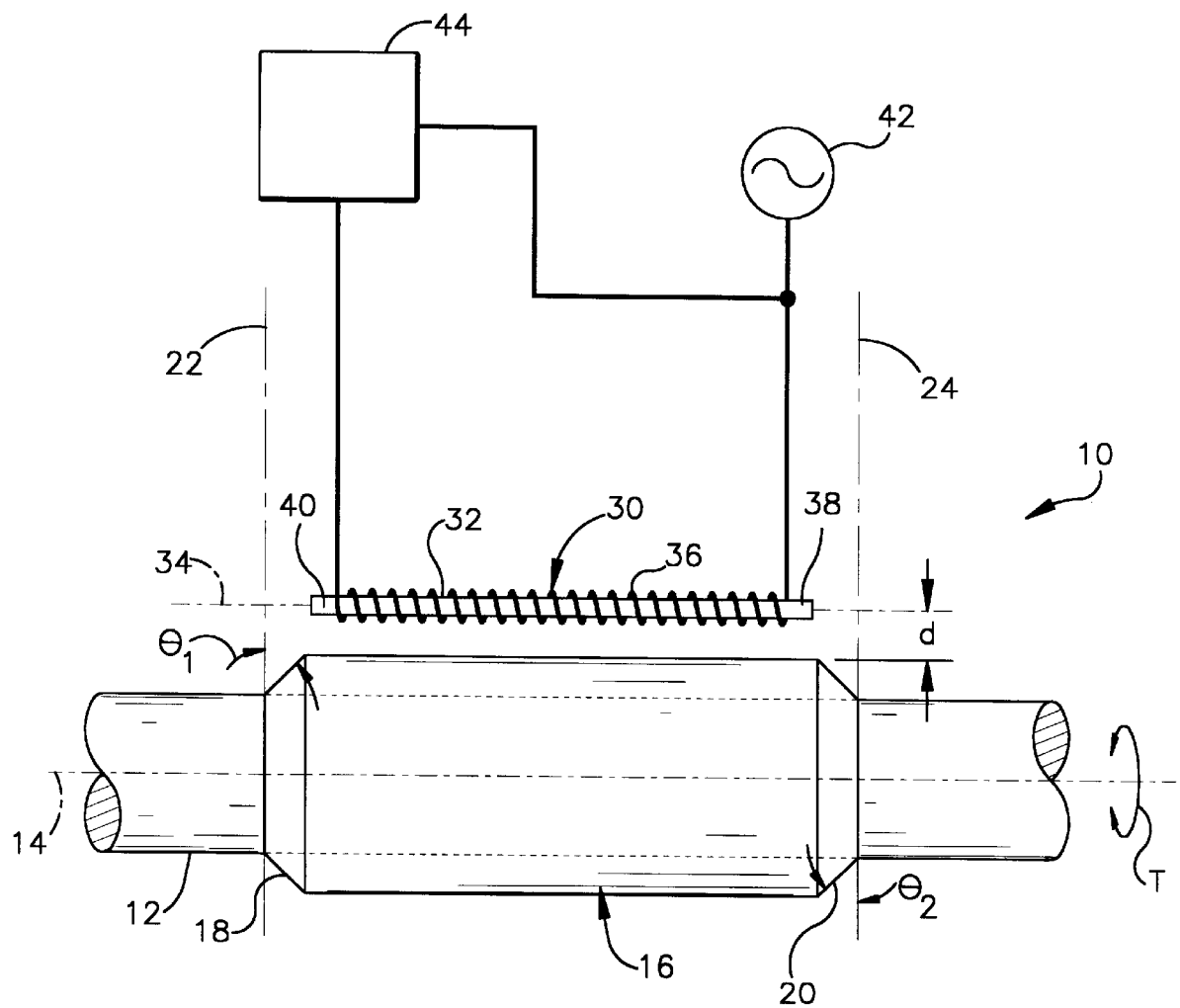

TORQUE SENSING APPARATUS HAVING A MAGNETOELASTIC MEMBER SECURED TO A SHAFT

FIELD OF THE INVENTION

The present invention relates to a torque sensing apparatus, and more particularly to a torque sensor that includes a magnetoelastic member.

BACKGROUND OF THE INVENTION

Numerous torque sensing devices have been developed to detect torque applied to an elongated shaft. Such torque sensing devices typically include a magnetoelastic ring secured about a shaft. The ring provides a magnetic field, typically in the axial direction, in response to torque applied to the shaft. A sensor is positioned adjacent to the magnetoelastic ring for sensing the magnetic field. The amount of torque is determined based upon the sensed magnetic field. Such systems often require complex sensors to adequately detect the magnetic field.

SUMMARY OF THE INVENTION

The present invention relates to a torque sensing apparatus for sensing torque in an elongated shaft having a longitudinal axis. The torque sensing apparatus includes a cylindrical magnetoelastic member secured coaxially about the shaft. The magnetoelastic member has first and second spaced apart end portions. Each end portion is axially chamfered at a predetermined angle with respect to a plane extending perpendicular to the shaft axis. The predetermined angle for each end portion ranges from about 42° to about 48°. The magnetoelastic member provides an axial magnetic field which changes in response to a torque applied to the shaft. A detector is positioned adjacent to the magnetoelastic member for sensing the magnetic field and providing a signal indicative of the applied torque.

BRIEF DESCRIPTION OF THE DRAWING

The foregoing and other features of the invention will become more apparent to one skilled in the art upon consideration of the following description of the invention and the accompanying drawing which illustrates a side elevation of a torque sensing apparatus in accordance with a preferred embodiment of the present invention.

DESCRIPTION OF A PREFERRED EMBODIMENT

The FIGURE illustrates a preferred embodiment of a torque sensing apparatus, generally indicated as 10, in accordance with the present invention. The torque sensing apparatus 10 senses torque applied to an elongated shaft 12, which may be a torsion bar of a vehicle steering system. The shaft 12 has a cylindrical outer surface and a longitudinal axis 14 extending coaxially through the shaft. The shaft 12 is formed of a rigid material, preferably having a low magnetic permeability. In response to a torque, indicated at T, applied about the longitudinal axis 14, the shaft 12 experiences torsion.

The torque sensing apparatus 10 includes a cylindrical magnetoelastic member, indicated at 16, secured coaxially about the shaft 12. The member 16 is a cylindrical tubular sleeve and may be press-fit, welded or otherwise secured to the outer surface of the shaft 12, such that there is no slip between the shaft 12 and member 16. The torsion of the shaft 12 due to the applied torque T is transferred to the magnetoelastic member 16.

The magnetoelastic member 16 has first and second spaced apart frustoconical end portions 18 and 20. Each end portion 18 and 20 is axially chamfered away from the member 16 at a predetermined angle relative to a respective plane, indicated at 22 and 24, which extends perpendicular to the shaft axis 14. The angles, indicated at $\Theta_1$ and $\Theta_2$, range from about 42° to about 48°, and preferably are about 45°. The axial length of the frustoconical end portions 18 and 20 will vary depending upon the thickness of the member 16, although the angles $\Theta_1$ and $\Theta_2$ preferably remain at about 45°.

The magnetoelastic member 16 is formed of a magnetic anisotropic material, such as, for example, a maraging steel material or any other material in the family of magnetoelastic materials. The member 16 is magnetically polarized in a circumferential direction about the shaft axis 14. The magnetoelastic member 16 has a thin cylindrical side wall portion and a predetermined axial length, which may vary based upon the application of the apparatus 10.

A detector 30 is positioned proximal to the magnetoelastic member 16 for sensing the magnetic field provided by the member 16. The detector 30 may be a solid state or integrated circuit sensor of known configuration, such as a Hall effect sensor. The detector 30 is shown to be a sensor coil assembly formed of an elongated core 32 having a longitudinal axis 34 substantially parallel to the shaft axis 14. The core 32 is formed of a cast amorphous wire of a magnetic material, suitably a known ferromagnetic material. The core 32 has a predetermined diameter of about 0.1 to about 0.2 millimeters. The detector 30 also includes a wire having a plurality of coil windings 36, suitably greater than about 200 turns, wound around at least a substantial portion of the axial length of the core 32. The coil windings 36 preferably are formed of an electrically conducting wire, such as, for example, a 41 gauge copper wire. The windings 36 are wound around the core 32 as a plurality of overlapping layers.

The core axis 34 is spaced a predetermined distance, indicated at d, from the outer surface of the magnetoelastic member 16. For example, with a core 32 having a diameter of about 0.125 millimeters, the core axis 34 suitably is spaced from about 1.75 millimeters to about 2.25 millimeters from the outer surface of the member 16. The particular distance d may vary depending upon the dimensions of the core 32, the radial thickness of the coil windings 36, the dimensions of the magnetoelastic member 16 as well as the particular application of the apparatus 10. The air gap between the outer surface of the coil windings 36 of the detector 30 and the member 16 suitably ranges from about 1.0 to about 1.75 millimeters. The elongated core 32 also is coextensive with the magnetoelastic member 16. Specifically, the core 32 has end portions 38 and 40 positioned adjacent the member end portions 18 and 20. Each core end portion 38 and 40 preferably is spaced from about 0.8 to about 1.2 millimeters from each respective member end portion 18 and 20.

The magnetoelastic member 16 provides an axial magnetic field, the flux density of which changes in response to the torque T applied to the shaft 12. The magnetic field has flux lines that travel through the core 32 and coil windings 36 between the chamfered end portions 18 and 20. The detector 30 senses the axial magnetic field provided by the magnetoelastic member 16. The detector 30 provides a signal indicative of the torque-responsive magnetic field and, thus, indicative of the applied torque T.

For example, an alternating source of power 42 having a known frequency and magnitude may be applied to one end of the coil windings 36. The output at the other end of the coil windings 36 may be supplied to a signal processing circuit 44, such as any known signal comparison circuitry. The signal supplied to the input of the coil windings 36 also is input to the signal processing circuit 44. The signal processing circuit 44 compares the input and output signals of the coil windings 36 and determines the applied torque T in a known manner.

The detected torque output signal from the signal processing circuit 44 may be provided to a system control circuit (not shown) for effecting actuation of desired components. The torque signal from the comparison circuitry 44, for example, may be used to control an electric motor for turning the wheels of a vehicle in response to torque applied to a hand steering wheel of the vehicle.

Because the end portions 18 and 20 are chamfered, the axially produced magnetic field and corresponding lines of flux are increased. It has been determined that an increase of about 5% in the signal strength may be provided by a system in accordance with the present invention having a magnetoelastic member with such chamfered end portions over a conventional system having a member with substantially flat end portions. Thus, the collection of the flux lines by the detector 30 is improved. This enables simplified electronics, such as the detector 30, to be used for sensing the torque-dependent magnetic field. In addition, conventional sensors will be able to detect smaller amounts of applied torque, thereby improving the responsiveness of the system. It also will be understood that a plurality of such torque sensing apparatuses may be used in connection with the shaft 12.

From the above description of the invention, those skilled in the art will perceive improvements, changes and modifications. Such improvements, changes and modifications within the skill of the art are intended to be covered by the appended claims.

Having described the invention, the following is claimed:

1. A torque sensor apparatus for sensing torque applied to an elongated shaft having a longitudinal axis, said apparatus comprising:

a tubular magnetoelastic member secured coaxially about said shaft, the magnetoelastic member having a generally cylindrical side wall portion that extends axially between first and second spaced apart end portions, each end portion having a chamfered surface extending at a predetermined angle relative to a plane that extends perpendicular to said shaft axis, each of said predetermined angles ranging from about 42° to about 48°, flux lines of a magnetic field extending axially through said magnetoelastic member and through said chamfered surfaces of said first and second end portions, the magnetic field changing in response to torque applied to said shaft; and a detector positioned adjacent said magnetoelastic member for sensing said magnetic field extending through said chamfered surfaces and providing a signal indicative of said applied torque, said detector comprising an elongated core having an axis substantially parallel to and spaced a predetermined distance from said shaft axis, said detector having a coil wound around at least a substantial portion of an axial length of said core.

2. The torque sensor apparatus of claim 1 wherein said elongated core of said detector includes first and second end portions, said first end portion of said core being adjacent said first end portion of said magnetoelastic member and said second end portion of said core being adjacent said second end portion of said magnetoelastic member, flux lines of the magnetic field traveling through said core between said first and second end portions of said magnetoelastic member.

3. The torque sensor apparatus of claim 1 wherein said core axis is spaced from about 1.75 mm to about 2.25 mm from said magnetoelastic member.

4. The torque sensor apparatus of claim 2 wherein each of said core end portions is spaced axially inward from about 0.8 mm to about 1.2 mm from said respective adjacent end portions of said magnetoelastic member.

5. The torque sensor apparatus of claim 1 wherein each of said predetermined angles is about 45° with respect to a plane extending perpendicular to said shaft axis.

\* \* \* \* \*